(No Model.)

T. DECKER.
NUT LOCK.

No. 326,407. Patented Sept. 15, 1885.

WITNESSES
F. L. Ourand
E. M. Johnson

Theodore Decker
INVENTOR

Attorney

United States Patent Office.

THEODORE DECKER, OF CHARLOTTESVILLE, INDIANA.

NUT-LOCK.

SPECIFICATION forming part of Letters Patent No. 326,407, dated September 15, 1885.

Application filed June 11, 1885. (No model.)

*To all whom it may concern:*

Be it known that I, THEODORE DECKER, a citizen of the United States of America, residing at Charlottesville, in the county of Hancock and State of Indiana, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in nut-locks; and it consists in the construction and combination of parts, as will be hereinafter fully set forth, and specifically pointed out in the claims.

Figure 1:
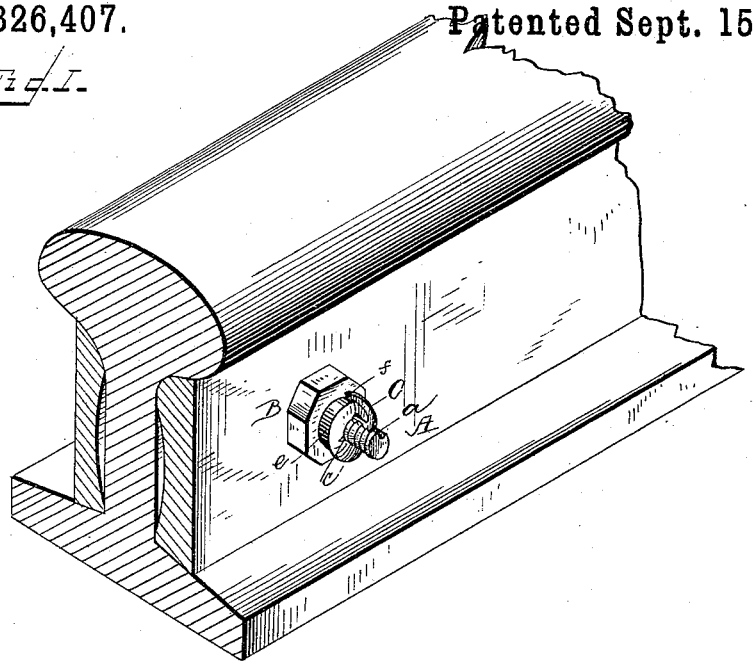
Figure 2:
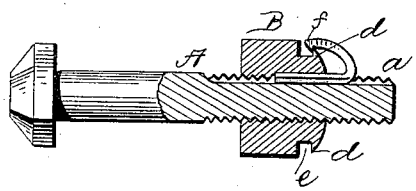
Figure 3:
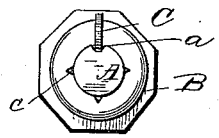
Figure 4:
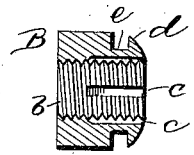
Figure 5:

In the accompanying drawings, which illustrate my invention, Figure 1 is a perspective view showing my improvement applied to a fish-plate of a railroad-rail. Fig. 2 is a sectional view. Fig. 3 is a front view. Fig. 4 is a sectional view of the nut, and Fig. 5 is a detailed perspective view of the fastening-bar before the same is bent in position.

A represents an ordinarily-constructed bolt, the portion of said bolt which is threaded being provided with the longitudinal angular groove $a$.

B represents the nut, which is provided with an interior or female thread, $b$, and also with recesses $c$, which are cut into said thread at suitable intervals. The upper portion or top of the nut projects slightly from its body portion, and is provided with an outwardly-projecting flange, $d$, which, when taken in connection with the body portion, forms a groove or recess, $e$.

C represents the fastening-bar, which corresponds in size with the recesses $c$ and groove $a$, when the nut and bolt are placed upon each other till the said grooves will be opposite.

The fastening-bar is provided with a notched head, $f$, as fully shown, which is adapted to engage with a flange, $d$, when said bar is bent, as shown in Fig. 2.

To fasten the nut securely upon the bolt, the nut is first tightened and screwed home, after which the bar C is inserted in one of the grooves $c$, formed in the nut, and also in the recess $a$, formed in the bolt. The end of the bar C is then bent over upon itself, as shown in Fig. 2, so that its notched end will engage with the flange $d$, and thus prevent the bar becoming displaced.

By this construction it will be readily seen that the bar C will prevent the nut turning upon the bolt, and that as its notched end engages with the flange of the nut the bar cannot become displaced or removed without first turning its end upwardly, so that it will not engage with the flange.

I claim—

1. In a nut-lock, the combination, with a grooved bolt and a nut provided with internal grooves and an annular external flange, of a pin adapted to be inserted in said grooves, and by a single bend upon the nut to engage with the flange, for the purpose set forth.

2. In a nut-lock, a bolt provided with a longitudinal groove extending the entire length of its threaded portion, and nut provided with one or more interior grooves and an outwardly-projecting annular flange, $d$, in combination with the fastening-bar C, having a barbed end which is adapted by a single bend upon the nut to engage with the flange of the nut, substantially as shown, and for the purpose set forth.

In testimony whereof I affix my signature in presence of two witnesses.

THEODORE DECKER.

Witnesses:
 W. R. WALKER,
 FRANK BRANDENBURGH.